United States Patent Office 3,770,795
Patented Nov. 6, 1973

3,770,795
4,4,4-TRINITROBUTYL CYANOACETATE
Ellis R. White, Oakland, Calif., assignor to Shell Oil Company, New York, N.Y.
No Drawing. Filed Oct. 12, 1970, Ser. No. 81,635
Int. Cl. C07c 121/16
U.S. Cl. 260—465.4
1 Claim

ABSTRACT OF THE DISCLOSURE

The novel 4,4,4-trinitrobutyl cyanoacetate and its use as a high-energy plasticizer of nitrocellulose binders for solid propellant systems.

---

The invention herein described was made in the course of or under a contract or subcontract thereunder, with the U.S. Air Force.

BACKGROUND OF THE INVENTION

High-energy polymers, such as nitrocellulose, used as high-energy binders for solid propellant systems are generally viscous liquids which require a plasticizer in order to mix, cast, and cure to propellants with acceptable physical properties. Commonly used plasticizers for nitrocellulose binders are compounds, such as nitroglycerine, ethylene glycol dinitrate, and the like, which are notoriously shock sensitive. On the other hand, nitriles such as adiponitrile are effective plasticizers but are not energetic per se. It would be advantageous to have available an energetic material containing a moderately high concentration of nitro groups and containing a highly plasticizing nitrile group, at the same time said energetic material having the property of being essentially not shock sensitive.

SUMMARY OF THE INVENTION

It has now been found that the novel 4,4,4-trinitrobutyl cyanoacetate of the formula

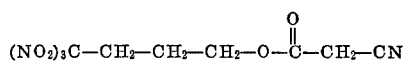

is an energetic nitro-nitrile plasticizer having essentially no significant sensitivity to shock and advantageously plasticizing nitrocellulose binders for solid propellant systems.

PREFERRED EMBODIMENTS OF THE INVENTION

The novel 4,4,4-trinitrobutyl cyanoacetate of the invention is an ester produced by esterifying a nitroalcohol, 4,4,4-trinitro-1-butanol, with a nitrile-containing carboxylic acid, cyanoacetic acid.

The 4,4,4-trinitro-1-butanol starting reagent is produced in a two-step reaction in which 4,4,4-trinitrobutyraldehyde is prepared by Michael addition of nitroform to acrolein, followed by sodium borohydride reduction of said nitroaldehyde to the desired nitroalcohol. Preferably the two-step synthesis is carried out in the presence of an inert solvent so that the 4,4,4-trinitro-1-butanol is available for the subsequent esterification in the form of a solution. Suitable solvents are normally liquid aromatic hydrocarbons, such as benzene, toluene, and xylene; normally liquid ethers, including dialkyl ethers such as diethyl ether, dibutyl ether, and methyl hexyl ether; alkyl aryl ethers such as anisole and phenyl butyl ether; cyclic ethers such as tetrahydrofuran, dioxane, and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether, and glycerol triethyl ether; and halogenated hydrocarbons such as dichloromethane, chloroform, carbon tetrachloride, dichloroethane, tetrachloroethane, bromoform, dibromoethane, chloropropane, bromobutane, 1-chloro-2,2-difluoroethane, chloropentane, chlorobenzene, chlorocyclohexane, and the like. The solvent is employed in molar excess over the amount of total reactants, and in general, moles of solvent up to about 150 moles per mole of total reactants are satisfactory. If desired additional purification of the 4,4,4-trinitro-1-butanol solution is obtained by water washing. Drying of such a water-washed solution is not necessary since this water impurity is removed conveniently in the subsequent esterification step along with the by-product water from the esterification reaction itself. An advantage of utilizing the 4,4,4-trinitro-1-butanol in the form of a solution is that the production can proceed from nitroform to the ultimate esterification product without having to isolate, for example, by distillation, the impact-sensitive intermediates, 4,4,4-trinitrobutyraldehyde and 4,4,4-trinitro-1-butanol. However, when desired, the 4,4,4-trinitro-1-butanol can be obtained in satisfactory purity as a bottoms product by removal of the solvent, e.g., by stripping off the solvent, and then heating to about 120° C. at reduced pressure, such as from about 1 to 50 mm. Hg, to remove substantially the last traces of solvent.

The esterification is conveniently carried out by heating, for example, under reflux, 4,4,4-trinitro-1-butanol and cyanoacetic acid in the presence of an esterification catalyst. The presence of a solvent is of advantage for ease of azeotropic removal of the water by-product formed during the esterification. If the alcohol is utilized in the form of a solution as mentioned hereinabove, the esterification solvent may be the same as that used for the production of the alcohol solution or it may be a different one. Suitable solvents for the esterification are the same as those given hereinabove for the production of 4,4,4-trinitro-1-butanol. A particularly preferred group of solvents for the esterification includes aromatic hydrocarbons and most preferred is benzene. Although stoichiometric amounts of the alcohol and the acid reagents are satisfactory, it is preferred to carry out the esterification utilizing a 10–15% mole excess of cyanoacetic acid. Although conventional esterification catalysts such as sulfuric acid are useable, it is preferred to utilize as catalyst a cation exchange resin containing carboxylic acid groups as the functional group thereof, such as Amberlyst 15 resin (Rohm and Haas Co.). At the completion of the esterification process, any excess of cyanoacetic acid is removed by washing with water or bicarbonate solution; however, it is preferred to wash with water to obtain the desired ester product with the most advantageous ultimate physical properties. Also it is preferred that the esterification be complete since any unreacted 4,4,4-trinitro-1-butanol remaining in the ester product has an adverse effect on the plasticizing action of the ester; however, unreacted trinitrobutanol can be removed, e.g., by distilling carefully.

The combination of physical properties exhibited by the 4,4,4-trinitrobutyl cyanoacetate of the invention are of advantage in rendering it a superior plasticizer for nitrocellulose binders of solid propellant systems. Its melting point, below −85° C., is sufficiently low to impart desirable low temperature properties in the finished propellant into which it is incorporated, i.e., to decrease the probability of crystallization of the plasticizer therefrom when the propellant is subjected to low temperatures. The heat of formation, $\Delta H_F$ (est.), of 4,4,4-trinitrobutyl cyanoacetate is −32.1 Kcal./100 g., thereby offsetting the energy loss incurred when propellants are formulated with less energetic (and therefore shock insensitive) plasticizers. Most significant is the stability toward impact of 4,4,4-trinitrobutyl cyanoacetate, which stability renders it advantageously and essentially not shock sensitive even though it is energetic. In order to measure plasticizing effect, qualitatively, candidate plasticizers are each mixed with an equal weight of fluid ball powder Type B grade of nitrocellulose, then left for one to two days in an oven at about 60° C. Candidate compounds whose mixtures remain fluid are considered to be inactive, those which thicken to a heavy paste are partly active, and those which form elastomers are considered to be effective plasticizers for nitrocellulose binders of solid propellant systems. When 4,4,4-trinitrobutyl cyanoacetate is so treated, the resulting mixture forms an elastomer. Thus the essentially stable-to-shock 4,4,4-trinitrobutyl cyanoacetate can be used advantageously to plasticize nitrocellulose binder, additionally improving the combustion efficiency of any cured propellant made therefrom by virtue of the nitro content of the plasticizer. Another advantage in the use of 4,4,4-trinitrobutyl cyanoacetate is that it acts as a coplasticizer for difluoramino plasticizers, which as a class are generally poorly compatible with nitrocellulose.

EXAMPLE

To a 12 l., glass reaction vessel fitted with a thermometer, dropping funnel and air-driven stirrer, and cooled with an ice bath were added 2400 ml. of water, 4800 ml. of dichloromethane, and 530 ml. (445 g., 7.8 moles) of acrolein which had recently been distilled, inhibited with 0.1% hydroquinone and stored at 5° C. The mixture was cooled to 10° C. and 2640 g. (950 g. net, 6.3 moles) of 36% nitroform in dichloromethane added during 30 minutes. There was no significant temperature rise. The system was left stirring overnight at ambient temperature. Then the layers were separated, the lower (dichloromethane) layer being transferred to a 5-gallon carboy. The dichloromethane solution of 4,4,4-trinitrobutyraldehyde was washed 4 times for 30 minutes each time with 1-gallon portions of strong aqueous sodium bicarbonate. Some effervescence occurs during the first wash so the mixture is stirred cautiously until bubbling subsides.

In a 12 l. reaction vessel fitted as described above, a sodium borohydride solution was prepared in situ by adding 1 gallon of 10° C. water to 90 g. (2.38 moles, 9.5 equivalents) of sodium borohydride. The reduction was accomplished by adding the hereinabove-prepared, wet dichloromethane solution of 4,4,4-trinitrobutyraldehyde to the aqueous sodium borohydride. The exothermic reaction was carefully controlled by cooling the vessel in an ice bath and stirring briskly while the aldehyde solution was added as fast as possible without having the temperature rise over 10° C. The addition took about 1.5 hours. At the end of this time the mixture was heated to 20° C. with warm water, then stirred 2 hours at 20–25° C., using ice water at first to control the mild remainder of the exotherm. Before proceeding further a small sample of the dichloromethane solution was withdrawn, dried, and analyzed for carbonyl content by infrared spectroscopy. Analysis indicated that 2 hours was sufficient to reduce all the aldehyde. The resulting product, a solution of 4,4,4-trinitro-1-butanol in dichloromethane, was washed three times with 0.5 gallon portions of saturated brine.

The esterification was carried out in a 12 l. glass reaction vessel fitted with a thermometer, air-driven stirrer, a Claisen take-off head which could be exchanged later for a Dean-Stark trap, and a condenser. The vessel was heated by immersion in a water bath kept hot by a steam line. To the vessel was added the above-prepared, wet brine-washed dichloromethane solution of 4,4,4-trinitro-1-butanol which was diluted with 4 l. of benzene. The solution of 4,4,4-trinitro-1-butanol was then stirred with 400 g. of cyanoacetic acid and 125 g. of Amberlyst 15 (Rohm and Haas Co.) resin while 4 l. of solvent was distilled off. A further 2 l. of benzene was added and more solvent stripped off, the procedure continuing until 11–12 l. of benzene had been used in a period of about 9–10 hours by which time the head temperature had risen from 45° C. to 79° C., indicating that the solvent exchange was virtually complete. A considerable amount of water had also been taken off. The Claisen head was exchanged for a Dean-Stark trap, an additional 65 g. of Amberlyst 15 resin added, and the system refluxed until no more water collected in the trap. About 8–12 hours refluxing were needed to complete the esterification. The resulting ester solution was filtered to remove the catalyst then washed with one gallon of water at 40° C., followed by 8 one-gallon washes with 65–75° C. water. After separation (done hot to avoid emulsification) the benzene phase was allowed to cool to ambient temperature and dried by being stirred with 50–100 g. of 13X molecular sieve pellets, then filtered and heated with 30 g. of Norit A charcoal. The dried benzene solution was concentrated to about 60% by weight of 4,4,4-trinitrobutyl cyanoacetate by repeated passes through a steam-heated stripping apparatus. The concentrate was passed through a wiped film evaporator at about 100° C. and at 40–100 microns pressure. This removed the remainder of the benzene solvent and also took overhead a 58.7 g. product distillate. The bottom product was passed through the wiped film evaporator again, this time at 90° C. and at 40 microns, giving 742 g. bottoms and 10.3 g. overhead. Infrared analysis showed that the first overhead material was largely 4,4,4-trinitrobutyl cyanoacetate, so this was passed through the wiped film evaporator at 90° C. and 40 microns to remove 4.2 g. of low-boiling components, leaving a 52.3 g. bottoms portion which by infrared analysis and refractive index was indistinguishable from the main bottoms portion and hence was combined with it, giving a total of 794.3 g. of 4,4,4-trinitrobutyl cyanoacetate. This product was heated with 1% w. of Norit A charcoal, and filtered. The refractive index, $n_D^{25}$, of this product is 1.4760. The 4,4,4-trinitrobutyl cyanoacetate per se exhibits quite good thermal stability upon standing but is advantageously stored as a 50% w. solution in 1,2-dichloroethane.

*Analysis.*—Calculated for $C_7H_8O_8N_4$ (percent): C, 30.5; H, 2.9; N, 20.3. Found (percent): C, 29.9; H, 3.3; N, 19.2.

The nuclear magnetic resonance and infrared spectra are consistent with the assigned structure.

Whereas the impact sensitivity of many energetic plasticizers may vary from about 2 to about 15 kg.-cm. as measured by the Olin-Mathieson closed-cup impact testing method where increasing values indicate increasing stability (e.g., nitroglycerine has a value of 2), 4,4,4-trinitrobutyl cyanoacetate gives a negative impact test result even at 150 kg.-cm.

I claim as my invention:
1. 4,4,4-trinitrobutyl cyanoacetate.

References Cited

UNITED STATES PATENTS

| | | | |
|---|---|---|---|
| 3,439,017 | 4/1969 | Stevens | 260—465.5 |
| 3,440,271 | 4/1969 | Engel | 260—465.5 |

LELAND A. SEBASTIAN, Primary Examiner

U.S. Cl. X.R.

149—88, 100